Nov. 10, 1959 N. E. BENSON 2,912,625

PLUG-IN ASSEMBLY UNIT FOR PRINTED CIRCUITS AND THE LIKE

Filed Jan. 4, 1955

INVENTOR

Norman E. Benson

BY

Webster & Davis

ATTORNEYS.

2,912,625

PLUG-IN ASSEMBLY UNIT FOR PRINTED CIRCUITS AND THE LIKE

Norman E. Benson, Westport, Conn., assignor to The Acme Wire Company, Hamden, Conn., a corporation of Connecticut Application January 4, 1955, Serial No. 479,825

1 Claim. (Cl. 317—101)

This invention relates to a plug-in assembly unit for printed circuits and the like, and has for an object to provide a plug-in unit comprising an insulating support on the surface of which conductors are mounted and to which electronic components may be connected, with the conductors providing electric circuitry connections for the components. It is also an object to provide a simple unit comprising a plurality of electronic devices, such, for example, as resistors, capacitors, condensers, diodes, transistors, subminiature electronic tubes, or other electronic components, all mounted on a body member of insulating material forming a support for these components, together with their various electrical connections, so that the unit as a whole, including these components and the various electrical connections, can be plugged as a unit into an electric printed circuit, such, for example, as printed circuits on a panel of suitable insulating material.

It is also an object to provide such a unit which may be removed as such from the printed circuit in a single operation and tested, and if any of the components have failed an entirely new unit may be quickly and easily plugged into the printed circuit, or any individual component may be replaced.

A further object is to provide a device of this character in which the assembled and electrically connected components of the unit may be enclosed in a suitable protective material, or that is encapsulated in a protective tube of plastic material, for example a plastic resin, so as to make the unit fungus-proof, and thus it is adapted for use in hot, moist climates.

A still further object is to provide a device of this character in which the complete electronic circuit including vacuum tubes and other electronic components, as mentioned above, could be carried in small cylindrical form and plugged as such a unit into a power supply or other circuit.

With the foregoing and other objects in view, I have devised the construction illustrated in the accompanying drawing forming a part of this specification. It is, however, to be understood the invention is not limited to the specific details of construction and arrangement shown, but may embody various changes and modifications within the scope of the invention.

Figure 4:
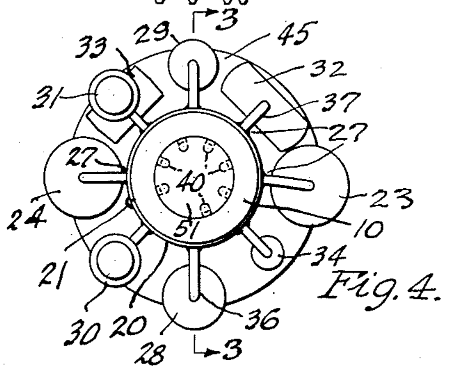
Fig. 4 is a top plan view.
Figure 5:
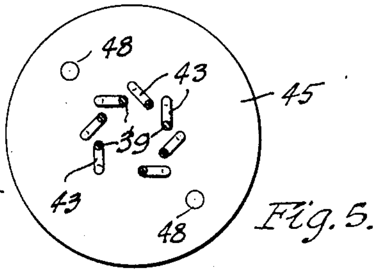
Fig. 5 is a detail section substantially on line 5—5 of Fig. 1.

The form of the device as shown comprises an elongated body 10 preferably in the form of a tubular member of electrical insulating material, such, for example, as a suitable molded plastic, forming a support for the various electrical devices and conductors, such, for example, as electronic devices or components including small vacuum tubes, resistors, capacitors, condensers, diodes and the like, transistors, subminiature tubes, or other electronic components. In its outer surface this body member or support is provided with a plurality of longitudinally spaced peripheral grooves or channels 11 in which are mounted any desired number of electrical conductors, preferably flat metal bands, which in the drawing are numbered from 12 to 20 inclusive, so that these bands are thus securely mounted in position on the body or support and electrically insulated from each other. These conductors could be in different forms, but are preferably metal bands of the desired thickness seated in the grooves or channels, and connected together at their ends as by soldering or welding, as indicated at 21 in Fig. 4. They are also provided with a suitable number of openings 22 to facilitate electrically connecting them to various electronic or similar devices, as will presently be described.

Mounted on the outside of this tubular body or support 10 are shown by way of example a number of different types or forms of electronic devices or components, but it is to be understood they are shown merely by way of example to indicate what forms of these devices may be used, and to also indicate how they may be connected and plugged into a printed or other circuit as a unit. Thus, for example, in the drawing, capacitors are indicated at 23 and 24 connected by conductors 25 and 26 respectively to the conductor bands 13 and 20. These conductors or wires can be connected to the band by any suitable means but, as shown on the drawing, their free ends are preferably bent inwardly and inserted into the proper openings 22 in the conductor bands and then soldered to them, as indicated at 27. Other elements are resistors 28, 29, 30 and 31, condensers 32 and 33, a transistor 34 and a diode 35, all connected by conductor wires at their opposite ends to the proper conductor bands 12 to 20, as indicated. Thus, for example, the resistor 28 is shown as connected by the conductors 36 to the bands 12 and 20, condenser 32 is connected by the conductors 37 to conductor bands 16 and 20, the diode 35 is connected by conductors 38 to bands 12 and 15, and so on for the various devices, as indicated.

At the lower end of the body member or support and projecting therefrom is an arrangement of contact pins to be plugged into a connector receptacle, in any desired circuit arrangement, such, for example, as a socket suitably connected in a printed circuit arrangement on an insulating panel such as that disclosed in my prior application Serial No. 473,814, filed December 8, 1954. The plurality of contact pins 39 are arranged to correspond with the arrangement of the socket contacts in the connector so that they may be readily inserted therein to provide the desired electrical connections to the various conductors of the printed circuit to the various electronic or other components assembled in this unit. In the arrangement shown these pins form the free ends of conductor wires 40 extending longitudinally within the tubular body member 10 and each secured at its upper end to one of the connector bands 12 to 20 to provide the proper electrical connections between the various electrical components and the power supply or other circuit. To secure the upper ends of these conductors to the band conductors 12 to 20 their upper ends are bent outwardly, as indicated at 41 in Fig. 6, and each passes through an opening in the wall of the insulating body 10 and through an opening 22 in the proper conductor band and soldered thereto, as indicated at 42. To secure and hold the projecting free end portions 39 in proper relation and arrangement, the wire is offset as indicated at 43 and seated in an elongated opening 44 in an insulating disc 45 with the free end passing through an opening 46 in a second disc 47, these discs being positioned at the lower end of the tubular body 10 and secured together by any suitable means, such, for example, as the rivets 48. These wires or conductors can be mounted in these discs 45 and 47, and then their upper portions with the laterally bent upper ends 31 inserted in the tubular member 10 from its lower end, and these laterally bent ends 41 sprung into the proper openings in the tubular member 10 and conductor bands 12 to 20 and soldered thereto, thus completing the proper electrical connections from the contact pins 39 to various conductor bands and the electronic components connected thereto.

Figures 1, 2:
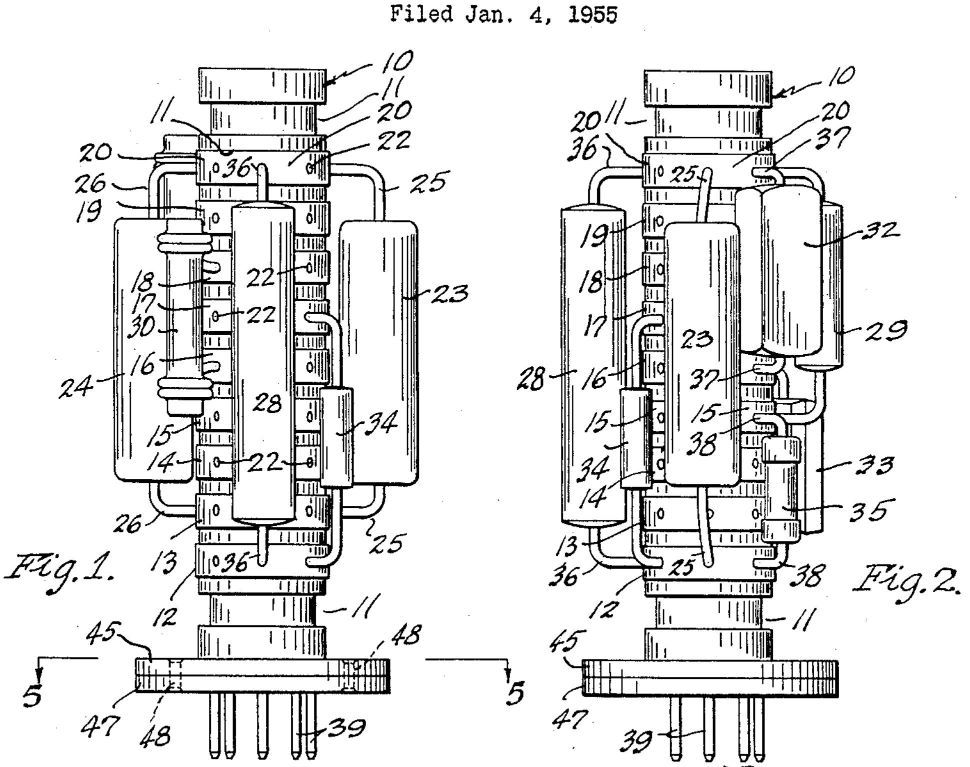
Fig. 1 is a side elevation of a unit comprising this invention, showing as examples a number of various electric devices or components which may be assembled and electrically connected in this unit.
Fig. 2 is a similar view looking from the right of Fig. 1.
Figures 3, 6:
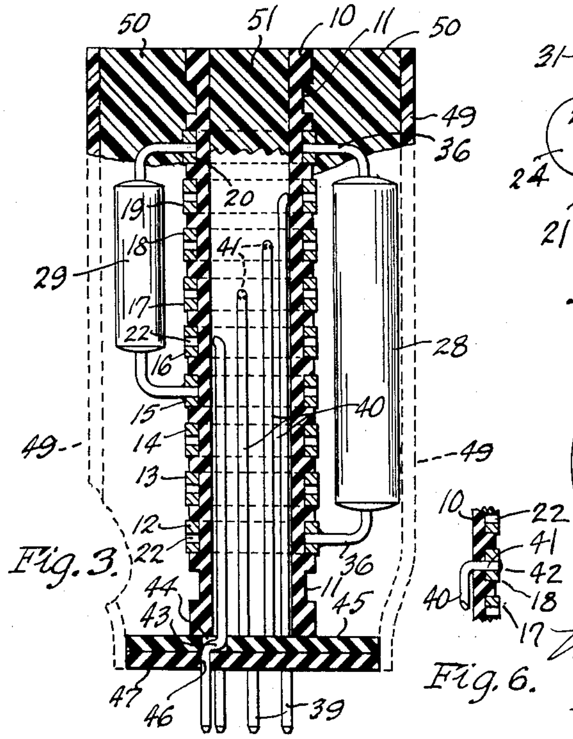
Fig. 3 is a transverse section substantially on line 3—3 of Fig. 4 and indicating how the assembled unit may be encapsulated and fungus-proofed.
Fig. 6 is a section of a small portion of a side wall of the body member and conductors mounted thereon, showing how the conductors may be connected to the contact pins for plugging into a connector receptacle.

The unit when assembled as shown in Figs. 1 and 2 may be used as such by merely plugging the contact pins 39 into a connector socket in a printed or other circuit arrangement. However, this assembly adapts itself to be encapsulated and fungus-proofed, as indicated in Fig. 3. Thus, for example, the whole assembled unit may be placed in a transparent or other plastic tube 49 and then this tube filled with a plastic resin 50, preferably a clear plastic resin so that the various electronic components of the unit are visible and may be examined, and also the interior of the tubular body 10 may be filled with this same plastic resin, as indicated at 51, thus embedding the conductors 40 in this resin. When so enclosed and filled, it will be seen the conductors and other electronic components are completely enclosed and embedded in this plastic resin or similar material and thoroughly protected from moisture, and injury or deterioration from fungus or similar deteriorating effects, and thus the unit is adapted for use in hot, humid climates and thoroughly protected from the usual damaging effects or conditions encountered. Although the transparent plastic material is preferred for the enclosing tube 49, it could be of metal or other material and filled with the plastic resin to protect the various elements. The plastic resin 50 and 51 is shown in Fig. 3 at the upper part of the unit only for simplification and clearness of the drawing, but it is to be understood it will be carried down the full length of the device, filling the tubes 10 and 49 and completely enclosing the various electronic devices or components and the conductors.

It will be seen from the above that this whole unit can be plugged in or removed from the printed circuit layout on a printed circuit panel, for example, by a single simple operation, and after removal from the printed circuit can be tested similar to tests used for vacuum tubes, and if any component has failed it can be replaced in the unit or the whole unit may be replaced in the circuit by merely plugging in a new unit. Furthermore, this assembled unit could comprise a complete circuit layout, including the electronic tubes as well as the resistors, condensers, and so forth, the various circuits being completed by connecting them to the proper conductor bands, and this assembly could be carried in a small cylinder form and plugged as a whole or as a unit into a power supply or any other circuit layout. It is particularly adapted for use in electronic and contronic control work. It is also adapted for use in guided missile work, electronic computers, radio and television devices, field and telephone work, walkie talkies, and so forth.

Having thus set for the nature of my invention, I claim:

A plug-in assembly unit comprising a tubular body member of insulating material provided with a plurality of longitudinally spaced peripheral grooves in its outer surface, electrical conductor bands mounted in the grooves providing electric circuitry on the surface of the support, the side walls of the tube and certain bands having aligned openings therein, plug-in contacts mounted at one end of the tube, conductor wires leading from said contacts within the tube and having laterally bent free ends passing through the openings in the tube into the openings in the conductor bands and secured thereto, and electronic devices mounted on the outside of the tubular body and electrically connected with certain of said conductor bands with the bands providing electric circuitry connections between the devices.

References Cited in the file of this patent

UNITED STATES PATENTS

| | | |
|---|---|---|
| 2,270,166 | Hiensch | Jan. 13, 1942 |
| 2,377,893 | Lorenzen | June 12, 1945 |
| 2,526,834 | Traugott | Oct. 24, 1950 |
| 2,590,821 | Kiser | Mar. 25, 1952 |
| 2,604,584 | Scoville | July 22, 1952 |
| 2,614,243 | Clark | Oct. 14, 1952 |
| 2,624,775 | Hughes | Jan. 6, 1953 |
| 2,628,270 | Himmel | Feb. 10, 1953 |
| 2,654,861 | Khovry | Oct. 6, 1953 |
| 2,720,578 | Caffiaux et al. | Oct. 11, 1955 |
| 2,737,579 | Wehrlin | Mar. 6, 1956 |

OTHER REFERENCES

Radio's Master, 1953–4, 18th edition, page F–55, Vector Plug-In Units, United Catalog Publishers, New York 13, N.Y.